June 20, 1967 S. PINCUS ETAL 3,327,029
METHOD FOR MOLDING AND TRANSPORTING GEL STATE FOAM
Filed April 2, 1964
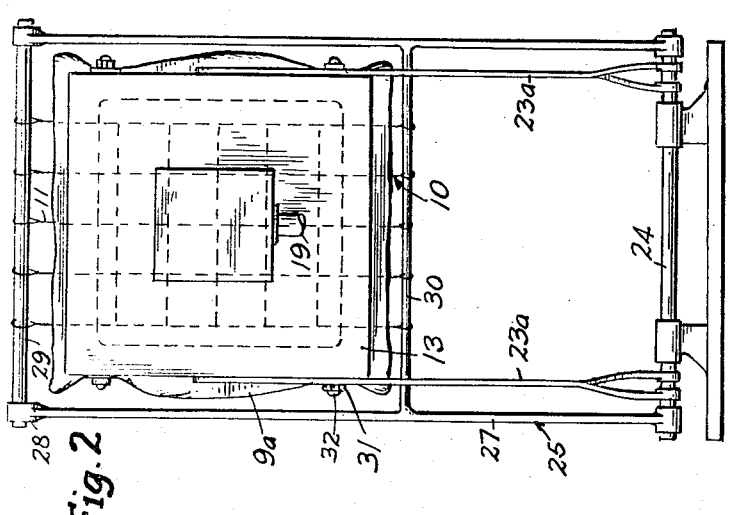
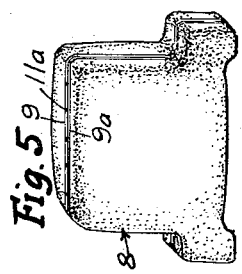
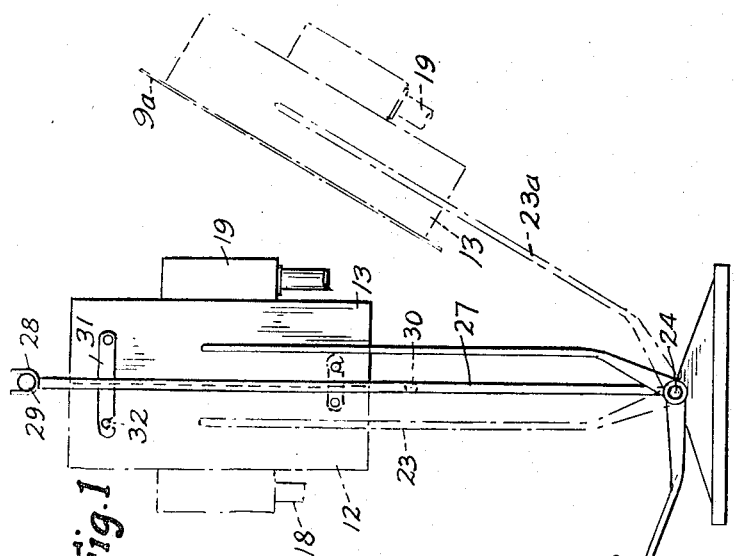
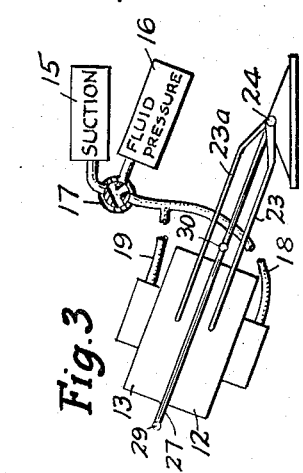
INVENTORS
Seymour Pincus
Edwin G. Krokauer
BY
Harry Jacobson
ATTORNEY

United States Patent Office 3,327,029
Patented June 20, 1967

3,327,029
METHOD FOR MOLDING AND TRANSPORTING GEL STATE FOAM
Seymour Pincus, Brooklyn, and Edwin G. Krakauer, Roslyn Heights, N.Y., assignors to Kay Manufacturing Corp., Brooklyn, N.Y., a corporation of New York
Filed Apr. 2, 1964, Ser. No. 356,805
11 Claims. (Cl. 264—45)

ABSTRACT OF THE DISCLOSURE

Polyurethane foam ingredients are expanded in a mold only until gelation to adhere to and surround the greater part of a gel carrier having a part accessible outside of the mold. The mold is emptied by using the accessible part of the carrier promptly after the foam reaches the fragile gel state. The shaped but still fragile and uncured foam gel is taken by the carrier away from the mold so that the empty mold is ready for immediate re-use while the removed gel is still fragile though undistorted because of its adherence to the carrier.

---

This invention relates to the method of molding and transporting relatively thick resilient articles such as furniture cushions of one shot polyurethane foam while the foam is still in a gel state. The term "gel" as used herein is intended to have the meaning given it in the Plastic Engineers' Handbook, 3rd edition, 1962, of the Society of the Plastic Industry and published by Reinhold Publishing Corp. of New York 22, N.Y., as follows:

gel—noun . . .
(2) The initial jelly-like solid phase which develops during the formation of a resin from a liquid. . . .
Both types of gel have very low strength and do not flow like a liquid. They are soft and flexible and will rupture under their own weigh unless supported externally.

Since considerable time is required to over-cure the foam gel after it has been molded to shape, it is desirable that while the molded foam article is still uncured but promptly after it has reached the gel state, it be separated from its mold and put into the curing oven. This permits reuse of the emptied mold while the molded article is being cured. However, one shot polyurethane foam in its gel state, while non-flowing, is fragile and unable to support its own weight and therefore is largely unmanageable.

Even external support therefor, such as an enclosing flexible envelope shaped by the mold or otherwise to the form of the desired article, cannot alone be safely depended upon to maintain the proper molder shape of the gel, nor to prevent distortion of the substantially non-resistant foam under various, even though slight, stresses acting thereon. Such stresses for example, are its weight and the inertia of the foam mass when movement thereof is begun or halted, accelerated or retarded. If the enclosing flexible envelope is of considerable height, the foam tends to gravitate toward the bottom of the envelope and there bulge out to a greater width than at its top. If the envelope is wide and low, the mass of foam tends to sag down in the middle when the envelope is supported at the sides or top. Without an envelope, the foam cells collapse on contact with an extraneous object and the mass is also likely to fracture or break off in chunks where the weight thereof is not adequately supported.

The present invention is therefore directed to meeting the problems above outlined, and is an improvement over the gel state molded and transportation method disclosed in our copending application Ser. No. 226,839, now Patent No. 3,187,069, wherein is shown a flexible mold liner adherent to the foam and forming an enclosing flexible envelope therefor releasable from the mold cavity together with its foam contents as a unit, the present invention permitting the handling of relatively large articles and those of odd and unusual shapes while they are still in the gel state.

This invention is further directed to the provision of a method of so molding and manipulating the gelled one shot polyurethane foamed article that the mold can be opened safely before the foam has been cured, and the molded mass of foam get through fragile and easily mutilated, can be adequately and dependably supported without any significant or material distortion, the support of foam gel carrier being designed especially for the arrangement of the mapor part thereof inside the interior of the foam mass, while end parts or attachments or extensions thereto protrude sufficiently beyond the mass for access thereto whereby the hazards of separation of the fragile foamed article in its gel state from the mold and its transportation in that state to a curing station, are largely overcome.

The invention is also directed to the provision of a method of avoiding the concentration of the weight of the foamed gelled mass of the article at the lower portion of the mass by transferring the weight of the gel to a suitable foam suspending member having suspending elements arranged at considerably spaced apart intervals at various points within the interior of the foamed mass to distribute the weight and relieve the lower part of the mass of a major part of the force of gravity acting thereon, the elements projecting from the molded mass sufficiently to permit the suspension thereof by suitable transporting means such as a hanger.

The invention is further directed to the use in the method of a foraminous foam engaging and suspending member such as a wide open fine net-like mesh having elongated suspending elements adherent to the foam gel and of insufficient area to induce planes of weakness which would lead to fractures of the cured foam in the molded article, or otherwise to hinder expansion of the foam to any significant extent, there being sufficient openings in the member to permit the foam mass suspended on all sides of the elements to coalesce around the elements and through the openings.

The invention is further directed to the provision of a simple and inexpensive method of molding one shot foamed polyurethane articles in a split mold including encasing the foamed mass in a mold-release liner while embedding foam suspending elements in the interior of the mass, promptly separating the mass while in a gel state from the mold and promptly transporting the mass while still in said state and preferably still tacky to a curing station and while it remains suspended from the elements.

The various objects of the invention will be clear from the description which follows and from the drawings, in which FIG. 1 is a generally diagrammatic side elevational view, partly in section, of a mold and foam suspending means capable of performing the method showing one half of the split mold in its open position with the liquid foam-forming ingredients inserted thereinto and showing the other mold half in its upright closed position ready to be opened, the ingredient-receiving mold half being also shown by dash-dot lines in the upright closed position assumed thereby before the expansion of said ingredients, and the other mold half being shown by dash-dot lines in its completely open foam-release position.

FIG. 2 is a front elevational view of the closed mold and the foam suspending means in the upright positions thereof.

FIG. 3 is a diagrammatical side elevational view of the closed mold, showing the suspending means in place at the parting line of the mold, but with the control valve in a position in which both the suction and pressure are cut off.

FIG. 4 it an elevational view of open mesh netlike form of the foam suspending member and the suspending hanger therefor.

FIG. 5 is a perspective view of a thick furniture cushion of a special shape adapted to be made by the invention.

Since the present invention is directed primarily to the method for insuring the retention of the stability of the shape of the unstable gelled mass during its removal from the mold, and its transportation prior to its heat curing, the construction of the mold and the method of making it need not be here described nor shown in any detail, except in diagrammatical form sufficiently clear to those skilled in the art. It should be understood however, that the mold is not inserted into the curing oven and therefore may be made largely of relatively inexpensive material such as substantially rigid foamed polyurethane. Such material is capable of being economically formed into special shapes, whereby the present invention is peculiarly well adapted for the manufacture of limited quantities of each of a great variety of differently shaped articles.

In FIG. 5 is shown one such special shape comprising the chair cushion 8 of resilient polyurethane foam, encased in a pair of polyethylene sheets 9 and 9a, the edges of which meet at the sides and ends of the cushion in the plane at which was positioned the parting line of the mold in which the cushion was molded. The net-like foam suspending member 10 shown in FIG. 4 is concealed within the interior of the cushion in the plane of the parting line above mentioned, but the ends 11a of the upright elements 11 of the member 10 may be visible between the edges of the sheets 9 and 9a.

As best seen in FIGS. 1 and 3, the ingredient-receiving half 12 which will be called "lower" half of the split mold and the other or "upper" mold half 13 are similar to each other, and are of the breathable type, being adapted to have suction applied to the cavity 14 thereof through the walls of the mold as by the suction means 15. The mold is also adapted to have pressure applied at said walls by the fluid pressure applying means 16. A suitable valve 17 controls the application selectively of either suction or pressure to both mold halves simultaneously through suitable conduits as 18, 19. The breathable mold has a substantial percentage of open cells therein communicating with the cavity. Enclosing the mold except at the parting line 20 is the box-like conduit carrier 21 which conducts air and gases to and from the walls of the mold cavity through the walls of the mold. Either suction or pressure may be applied to the mold release liners 9 and 9a during the molding operation as will be more fully described hereinafter. For ease in opening and closing the mold, each mold half is preferably pivotally supported to swing into various positions and to be set in said positions for definite time intervals sufficient to permit the desired operations to be performed and the desired reactions to take place. As shown, the arms 23 attached to the mold half 12 are pivoted to the fixed shaft 24 and are held by suitable releasable means, not shown, in the respective inclined positions shown in FIGS. 1 and 3 when the molding operation is to begin and during the molding operation. The arms 23 and the mold half 12 are swingable, after the mold is closed into the substantially upright positions thereof shown by the dash-dot lines in FIG. 1 and are there releasably held until the mold is opened. Similarly, the upper mold half 13 is preferably supported for swinging movement into the mold closing positions of FIGS. 3 and 1 and into the inclined open position shown by the dash-dot lines of FIG. 1. For this purpose, the arms 23a carrying the mold half 13 are pivoted to the shaft 24, the mold 13 being releasably held in the inclined open position thereof when required.

The frame 25 is part of and carries the remaining part 10 of the foam suspending means and is also pivoted to the shaft 24. The uprights 27 of the frame are shown as bifurcated at the upper ends 28 thereof for the easy assembly and removal of the upper hanger bar 29 of the frame. The lower transverse tie bar 30 extends between the uprights 27.

The foam supporting member 10 may take any one of a number of different forms, all designed to minimize the hindrance or obstruction of the elements of the member to the expansion of the foam. The method illustrated permits the foam to pass through relatively large openings therein and to coalesce on all sides of the weight bearing and transmitting elements, thereby to avoid the formation of undesirable skin or planes of weakness during the ascent of the foam. The member is also designed to relieve the lower portion of the foam from the weight of the foam above it, by interposing the weight bearing and weight transmitting elements between the upper and lower foam portions at closely enough spaced intervals to afford proper support. Obviously, increase in the number or dimensions of such elements reduces the size of the openings or spaces therebetween and thereby also increases the obstruction of the elements to expansion of the foam. Consequently, the closer the elements, the finer or thinner and narrower they should be. However, the supporting insert member may take any form which does not change its shape during the handling of the foam mass suspended thereon, and provided that it extends over a sufficiently large area of the suspended mass and is associated with gripping elements protruding beyond the mold. Nor need the insert be planar.

It has been found for example, that a wide open mesh net-like member 10 with elements 11 of intersecting horizontal and vertical fabric threads secured together at the intersections thereof to present openings approximately four inches square, make a satisfactory supporting member. Imperforate sheet material which can be stripped from the foam is useful for the insert in the case where the molded articles when cured, is to be split at the parting line to form two articles. Perforated sheet material such as plastic, paper or the like is also useful. For unusually thick or heavy molded articles a number of preferably, though not necessarily, parallel suspending or supporting members may be employed by using a three or more part split mold and arranging a suspending member at each of the parting lines of such multi-part split mold. It should be understood that the parting line of any form of split mold need not necessarily be planar.

In any case, it is highly advisable that the suspending insert, whatever form it may take, be so held within the foam gel that there can be no appreciable relative movement between the insert and the foam adjacent or adhering thereto. Any such relative movement would often result in such damage to the foam as to be quite likely to produce a defective product.

Since the gel has high adherent characteristics, the foam cells adhere quite well to those portions of the insert which it contacts, whether or not the insert is in the form of a mesh, net, sheet, strip, core or other form.

Such adherent cells in turn adhere to the cells which they touch. It will therefore be understood that each such portion of the suspending element, regardless of its shape, disposition or dimensions, supports a portion of the volume of the entire mass of gelled foam and thereby so contributes to the support of the otherwise unstable foam, insofar as the shape of the foam is concerned, that safe management of the mass becomes possible, even on a successful commercial scale.

To hold the suspending member properly, it is itself suspended from the hanger bar 29 at its upper end and stretched relatively taut and attached at its lower end to the lower bar 30 of the frame 25. There being no looseness or play in a vertical direction in the taut elements 11, there can be no movement of said elements relatively to the foam which comes into contact with and adheres to the element. Closing of the mold parts 12 and 13 upon each other and upon the end portions of the elements 11 projecting from the mold, especially at the top and bottom, as by hooks 31 and pins 32, also serves to secure the suspending member in its proper position against undesired movement relatively to the foam mass, not only during the molding operation, but also during transportation thereof at least to the curing oven.

In using the apparatus above described to carry out the molding, suspending, and transporting with or without curing of one shot polyurethane foam, timing of the various steps in expanding and curing the foam being well known, such timing will merely be referred to as "prompt." It being assumed that the mold is open, as for example, in the full line position of the mold half 12 and the dash-dot line position of the mold half 13 shown in FIG. 1, the mold cavity 14 is first lined with the mold release liner sheets 9 and 9a of suitable thin and stretchable plastic material such as polyethylene about 0.0004 of an inch thick. The sheets are arranged in place to fit the cavity walls smoothly and suction applied, thereby adequately sealing the surfaces of the cavity. Preferably, the marginal portions of the sheet project beyond the mold on all sides as best seen in FIG. 2. To hold the sheets in place against the cavity walls and to aid in smoothing the liner sheets, the control valve 17 is turned to connect the suction means 15 operatively to the conduits 18 and 19 of both mold halves. Suction is maintained until expansion of the foam has been completed and the mold cavity has been filled and the foam has gelled. However, when the mold is to be opened for the removal of the foam mass, suction is cut off.

Into the lower empty mold half or into both mold halves if convenient, a metered quantity of foam producing ingredients as 33 (FIG. 1) is inserted, said mold half or halves being approximately in the position or at the inclination shown by the full line representation of the mold half 12, that is, in an intermediate position between the vertical and horizontal and sufficiently tilted to insure the proper expansion of the foaming ingredients without material resistance thereto. Promptly after the ingredients have been inserted into the prelined mold half, the frame 25 together with the suspending member held thereby, are moved to a positon bridging the mold cavity at the parting line of the mold and the mold is closed. If convenient, the foaming ingredients may be divided between both mold halves and said halves closed upon each other and upon the suspending member. If the mold comprises more than two parts, a suspending member is arranged across the cavity at each of the parting line. Foaming of the ingredients proceeds.

For proper expansion of the foam, the mold and the foam suspending means comprising the frame 25 and the suspending member 10 secured to the frame, are swung as a unit promptly into the upright positions thereof shown in FIG. 1 for the time necessary to complete the expansion and to permit the foam to be transformed into the gel state and to allow the gases to escape from the mold cavity through a suitable sprue opening in the mold. Suction being cut off from the cavity by the valve 17, the valve is operated to apply slight fluid pressure on the order of one pound per square inch through the mold walls to those surfaces of the liner sheets 9 and 9a adjacent the cavity walls. Such pressure relieves the tendency of the sheets to stick to the cavity walls and aids in separating them, thereby enabling easy opening of the mold without damage to, distortion of or change in shape or size of the liner-encased molded mass of foam gel.

When the mold is opened, the gel mass remains suspended on the insert or suspending member 10, which in turn remains suspended by its protuberances on the hanger bar 29. If said member 10 is of the type which must be secured to the lower frame bar 30, then the protuberances of the member which fasten it to the bar 30 or to the uprights 27 are severed or otherwise removed if required. Should it be desired to utilize the bar 30 as a weight applied to the insert member to keep it taut, said bar is allowed to remain attached to the member but is removed from the frame 25.

The encased foam mass, with the extensions of the member 10 protruding from the top thereof, remains suspended from the hanger bar 29 and can be transported therewith by means of said bar to the curing oven. In said oven, the bar is hung upon suitable supports for the necessary curing time. On removal from the oven of the cured foam, the projecting margins of the liner sheets and the extensions of the insert are trimmed off if desired and the foam cushion is finished in any known manner as by suitable coverings or upholstery, or used as molded, or split if the molded article is of the duplex type and designed to be split at the insert.

While the foam mass is being cured, the emptied mold may be relined and the process repeated for the production of an article as previously molded as many times as duplicates are desired. It will be understood that by reason of the use of a suitable foam suspending means comprising a member of the proper shape, size and material inserted into the interior of the article at least until the cure is completed and having grippable extensions protruding out of the mold at the parting line, it becomes posssible to remove from the mold and to transport safely, the otherwise unmanageable foam gel and that the various objects of the invention have been adequately attained.

While certain specific forms of the invention have herein been shown and described, various changes may be made therein without departing from the spirit of the invention defined by the appended claims.

We claim:

1. The method of molding and transporting fragile polyurethane foam gel prior to the cure of the gel, comprising placing a gel carrier, to which the foam gel can adhere, into the path of expanding foam ingredients shaped in a mold thereby to bond the gel to the carrier, and moving the carrier and the gel as a unit relatively to the mold promptly after gelation of the foam and before any substantial curing of the gel to empty the mold of the shaped gel preparatory to the re-use of the mold and while the carrier is inside of and supports the gel.

2. The foam gel molding and transporting method of claim 1, the foam gel being shaped in the mold by pouring one shot polyurethane foam ingredients into a flexible sheet shaped by and held in the mold, and permitting the ingredients to foam and expand within the sheet until gelation of the foam and into adhesive engagement with the gel carrier.

3. The foam gel molding and transporting method of claim 1, the expanding foam penetrating the carrier and relative movement of the carrier and the resulting foam gel being prevented.

4. The method of molding and transporting a relatively thick mass of one shot polyurethane foam gel preparatory to cure of the gel, comprising lining a breathable mold having substantially rigid walls with a flexible liner sheet, applying suction to the inner surface of the sheet to hold the sheet snugly to said walls, arranging a gel carrier in the mold with an accessible part thereof projecting outside of the mold, expanding the ingredients until the resulting foam gels and adheres to the carrier, substituting for said suction fluid pressure applied to the inner surface of the liner sheet to separate the sheet from the cavity walls, maintaining the fluid pressure while opening the mold, and separating the fragile gel, while encased in said sheet, from the mold for curing, the separating step including engaging and holding the accessible part of the gel carrier while the carrier and the mold are moved relatively to each other.

5. In the method of molding and transporting a relatively thick mass of shaped but uncured one shot polyurethane foam, in a fragile gel state the steps of lining the cavity walls of each part of a split mold with a mold release foam-encasing liner sheet, inserting a foam suspending insert member between the mold parts, expanding one shot polyurethane foam within the mold, the expansion continuing until the foam comes into contact with the insert member and until the mass of foam gels, and by means of the suspending member removing from the mold the member, the fragile gelled mass suspended on the member and the mass-encasing liner sheets adhering to the mass to empty the mold for re-use preparatory to the curing of the mass.

6. The molding and transporting method of claim 5, and maintaining the encased fragile foam mass suspended on said member and out of the mold while the foam cures.

7. The molding and transporting method of claim 5, the suspending member being foraminous and being maintained relatively immovable relatively to the mass when in place until curing is completed and permitting substantially free expansion of the foam in the mold.

8. The molding and transporting method of claim 5, applying suction to the liner sheets to hold said sheets closely to said walls until the mass gels and applying fluid pressure to the inner surfaces of said sheets as the mold is opened to aid in separating the sheets from said walls.

9. The method of molding and curing one shot foamed polyurethane articles of substantial thickness, comprising expanding polyurethane foaming ingredients into a mold release liner adherent to the foam during the molding of the foam in a split mold, arranging a carrier for the foam in the path of the foam in a position to protrude out of the foam and out of the mold, separating the foam encasing liner from the mold while the foam therein is still in a gel state and adheres to the carrier, and transporting the fragile foam encased in the liner with the carrier as a unit to a curing station while the encased foam remains suspended on said carrier.

10. The method of molding and manipulating a relatively thick mass of one shot polyurethane foam gel comprising lining a breathable mold having substantially rigid cavity walls with a thin flexible liner sheet, applying suction to the inner surface of the sheet to hold it snugly to said walls, inserting foaming ingredients into the liner in part of the mold, arranging spaced apart gel-suspending elongated elements to fit the cavity walls and to project beyond the mold, closing the mold, expanding the ingredients until the foam gels, substituting for said suction fluid pressure applied to the inner surfaces of the liner sheet to separate the sheet from the walls of the cavity, maintaining the fluid pressure while opening the mold, and carrying the resulting gel while encased in said sheets to a curing station by means of said elements while the encased gel remains suspended from said elements.

11. In the method of making in a split mold and transporting therefrom a shaped quantity one shot polyurethane foam gel, the steps of molding and encasing the foam gel in a mold release liner removably inserted into the mold, arranging an open mesh net-like gel-suspending member at the parting line of the mold to project beyond the mold and to become arranged largely within the interior of the molded foam gel when the gel is molded and to adhere to the gel when the mold is opened, and suspending the member and the line-encased gel suspended from the member for movement as a unit relatively to the mold when the mold is opened and while the gel is still uncured and fragile, and moving the member and the mold relatively to each other to open and empty the mold preparatory to the cure of said quantity of foam gel and thereby freeing the mold for re-use while said quantity cures.

References Cited

UNITED STATES PATENTS

| | | | |
|---|---|---|---|
| 1,176,346 | 3/1916 | Cooper | 249—170 XR |
| 1,863,854 | 6/1932 | Jeffery | 264—313 XR |
| 2,858,572 | 11/1958 | Burdick | 264—15 |
| 2,955,972 | 10/1960 | Wintermute et al. | 264—45 XR |
| 3,097,397 | 7/1963 | Leach et al. | 18—39 XR |
| 3,257,484 | 6/1966 | Barnette | 18—39 XR |

FOREIGN PATENTS

| | | |
|---|---|---|
| 841,647 | 7/1960 | Great Britain. |
| 873,518 | 7/1961 | Great Britain. |

ALEXANDER H. BRODMERKEL, *Primary Examiner.*

P. E. ANDERSON, *Assistant Examiner.*